US005791562A

United States Patent [19]

Kramer et al.

[11] Patent Number: 5,791,562

[45] Date of Patent: Aug. 11, 1998

[54] CONICAL CENTERBODY FOR A TWO STREAM TANGENTIAL ENTRY NOZZLE

[75] Inventors: Stephen K. Kramer, Stuart; Peter F. Hauck, Jupiter, both of Fla.

[73] Assignee: United Technologies Corporation, Hartford, Conn.

[21] Appl. No.: 771,460

[22] Filed: Dec. 20, 1996

[51] Int. Cl.$^{6}$ .................. B05B 1/34; B05B 7/10; F02C 1/00

[52] U.S. Cl. .................. 239/399; 239/403; 239/463; 60/737

[58] Field of Search .................. 239/398, 399, 239/403, 405, 461, 463, 472; 60/737, 738, 748

[56] References Cited

U.S. PATENT DOCUMENTS

| | | | |
|---|---|---|---|
| 5,307,634 | 5/1994 | Hu | 60/737 |
| 5,479,773 | 1/1996 | McCoomb et al. | 60/748 X |
| 5,613,363 | 3/1997 | Joshi et al. | 239/403 X |
| 5,671,597 | 9/1997 | Butler et al. | 239/472 X |
| 5,675,971 | 10/1997 | Angel et al. | 60/748 X |
| 5,680,766 | 10/1997 | Joshi et al. | 239/405 X |

*Primary Examiner*—Andres Kashnikow
*Assistant Examiner*—Robin O. Evans
*Attorney, Agent, or Firm*—Christopher T. Hayes

[57] ABSTRACT

A centerbody for a tangential entry nozzle having a longitudinal axis and a radially outer surface including a frustum portion defining the outer surface of a frustum that is coaxial with the longitudinal axis and flares toward the frustum base thereof, and a curved portion which is integral with the frustum portion and preferably defines a portion of the surface generated by rotating a circle which is tangent to the frustum portion and has a center which lies radially outward thereof about the longitudinal axis. The centerbody has a base which includes at least one air supply port extending therethrough, and an internal passageway. The frustum portion tapers towards a discharge orifice of the internal passageway, and terminates at the plane in which the discharge orifice is located. A fuel-lance that is coaxial with the axis and extends through the base and terminates within the internal passageway provides fuel to the air flow in the centerbody.

1 Claim, 3 Drawing Sheets

CONICAL CENTERBODY FOR A TWO STREAM TANGENTIAL ENTRY NOZZLE

TECHNICAL FIELD

This invention relates to low NOx premix fuel nozzles, and particularly to centerbodies used in such nozzles.

BACKGROUND OF THE INVENTION

The production of nitrous oxides (hereinafter "NOx") occurs as a result of combustion at high temperatures. NOx is a notorious pollutant, and as a result, combustion devices which produce NOx are subject to ever more stringent standards for emissions of such pollutants. Accordingly, much effort is being put forth to reduce the formation of NOx in combustion devices.

One solution has been to premix the fuel with an excess of air such that the combustion occurs with local high excess air, resulting in a relatively low combustion temperature and thereby minimizing the formation of NOx. A fuel nozzle which so operates is shown in U.S. Pat. No. 5,307,634, which discloses a scroll swirler with a conical centerbody. This type of fuel nozzle is known as a tangential entry fuel nozzle, and comprises two offset cylindrical-arc scrolls connected to two endplates. Combustion air enters the swirler through two substantially rectangular slots formed by the offset scrolls, and exits through a combustor inlet port in one endplate and flows into the combustor. A linear array of orifices located on the outer scroll opposite the inner trailing edge injects fuel into the airflow at each inlet slot from a manifold to produce a uniform fuel air mixture before exiting into the combustor.

Premix fuel nozzles of the tangential entry type have demonstrated low emissions of NOx relative to fuel nozzles of the prior art. Unfortunately, fuel nozzles such as the one disclosed in the aforementioned patent have exhibited an unacceptably short operational life when used in gas turbine engines, due in part to attachment of flames to the nozzle centerbody. As a result, tangential entry fuel nozzles of this type have not been incorporated into commercially available gas turbine engines.

What is needed is a centerbody for use in tangential entry fuel nozzles that has a significantly increased operational life as compared to the prior art when used in gas turbine engines.

SUMMARY OF THE INVENTION

It is therefore an object of the present invention to provide a centerbody for a low NOx fuel nozzle which centerbody has a significantly increased operational life as compared to the prior art when used in gas turbine engines.

Another object of the present invention is to provide a centerbody for tangential entry fuel nozzles that significantly reduces the tendency of flames to attach to the centerbody thereof.

Accordingly, the centerbody of the present has a longitudinal axis and a radially outer surface including a frustum portion defining the outer surface of a frustum that is coaxial with the longitudinal axis and flares toward the frustum base thereof, and a curved portion which is integral with the frustum portion and preferably defines a portion of the surface generated by rotating a circle which is tangent to the frustum portion and has a center which lies radially outward thereof about the longitudinal axis. The centerbody has a base which includes at least one air supply port extending therethrough, and an internal passageway. The frustum portion tapers towards a discharge orifice of the internal passageway, and terminates at the plane in which the discharge orifice is located. A fuel-lance that is coaxial with the axis and extends through the base and terminates within the internal passageway provides fuel to the air flow in the centerbody.

BRIEF DESCRIPTION THE DRAWINGS

DESCRIPTION OF THE PREFERRED EMBODIMENT

Figure 1:
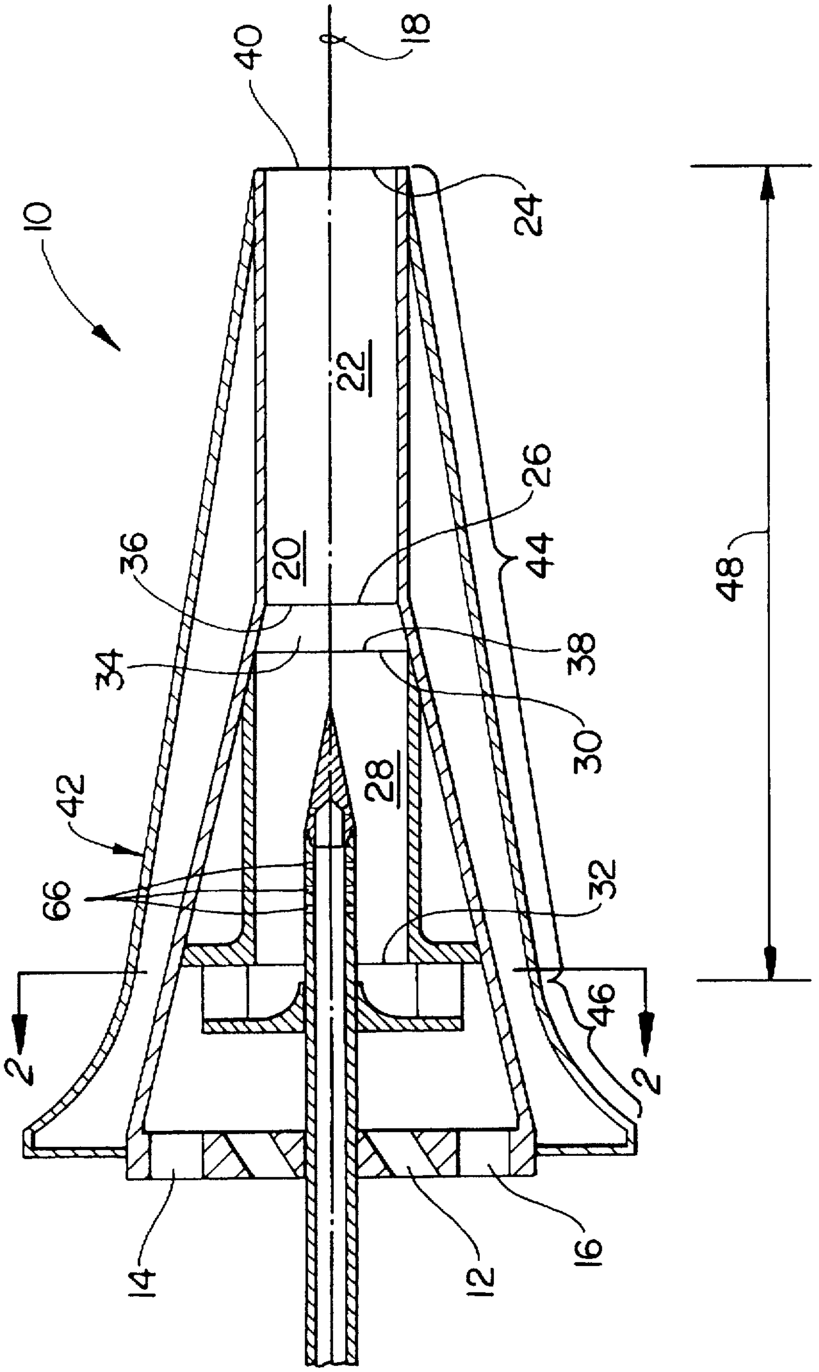
FIG. 1 is a longitudinal cross-sectional view of the centerbody of the present invention.

Referring to FIG. 1, the centerbody 10 of the present invention has a base 12 that has at least one, and preferably a plurality, of air supply ports 14, 16 extending therethrough, and the base 12 is perpendicular to the longitudinal axis 18 of the centerbody 10. The centerbody 10 also has an internal passageway 20 that is coaxial with the longitudinal axis 18. In the preferred embodiment of the invention, the internal passageway 20 includes a first cylindrical passage 22 having a first end 24 and a second end 26, and a second cylindrical passage 28 of greater diameter than the first cylindrical passage 22 and likewise having a first end 30 and a second end 32. The second cylindrical passage 28 communicates with the first cylindrical passage 22 through a tapered passage 34 having a first end 36 that has a diameter equal to the diameter of the first cylindrical passage 22, and a second end 38 that has a diameter equal to the diameter of the second cylindrical passage 28. Each of the passages 22, 28, 34 is coaxial with the longitudinal axis 18, and the first end 36 of the tapered passage 34 is integral with the second end 26 of the first cylindrical passage 22, while the second end 38 of the tapered passage 34 is integral with the first end 30 of the second cylindrical passage 28. The first cylindrical passage 22 includes a discharge orifice 40 that is circular and coaxial with the longitudinal axis 18, and is located at the first end 24 of the first cylindrical passage 22.

The radially outer surface 42 of the centerbody 10 is includes a frustum portion 44, which defines the outer surface of a frustum that is coaxial with the longitudinal axis 18 and flares toward the base 12, and a curved portion 46 which is integral with the frustum portion 44 and preferably defines a portion of the surface generated by rotating a circle, which is tangent to the frustum portion 44 and has a center which lies radially outward thereof, about the longitudinal axis 18. In the preferred embodiment, the frustum portion 44 terminates at the plane within which the discharge orifice 40 is located, the diameter of the base (not to be confused with the base 12 of the centerbody) of the frustum portion 44 is 2.65 times greater than the diameter of the frustum portion 44 at the apex thereof, and the height 48 of the frustum portion 44 (the distance between the plane in which the base of the frustum portion 44 is located and the plane in which the apex of the frustum portion 44 is located) is approximately 1.90 times the diameter of the frustum portion 44 at the base thereof When used within a tangential entry nozzle, the curved portion 46, which is located between the base 12 and the frustum portion 44, provides a smooth transitional surface that directs combustion air entering the tangential entry nozzle 10 adjacent the base 12. The internal passageway 20 is located radially inward from the radially outer surface 42 of the centerbody 10, the frustum portion 44 is coaxial with the longitudinal axis 18, and the centerbody 10 is connected to the base 12 such that the frustum portion 44 tapers toward, and terminates at the discharge orifice 40 of the first cylindrical passage 22.

Figure 2:
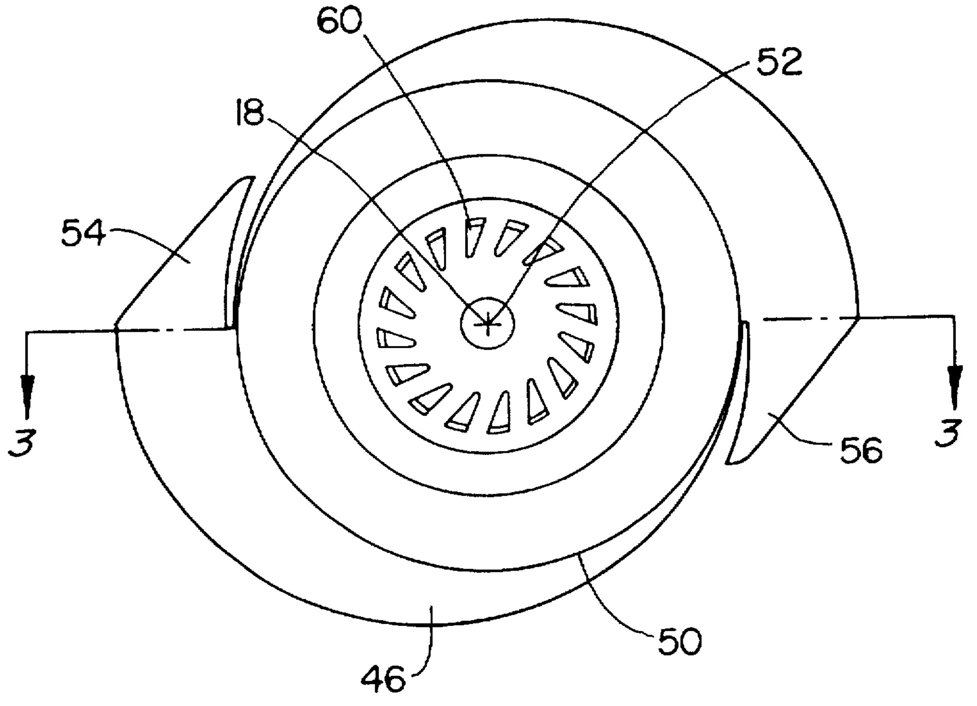
FIG. 2 is a cross-sectional view taken along line 2—2 of FIG. 1.

As shown in FIG. 2, the base of the frustum portion 44 fits within a circle 50 having its center 52 on the longitudinal axis 18. As those skilled in the art will readily appreciate, since the mixing zone of a tangential entry fuel nozzle is not circular in cross section, the curved portion 46 must be cut to fit therein. A ramp portion 54, 56 is left on the curved portion 46 where the curved portion 46 extends into each inlet slot of the tangential entry nozzle, and this portion is machined to form an aerodynamically shaped ramp 54, 56 that directs the air entering the inlet slot away from the base 12 and onto the curved portion 46.

Figure 3:
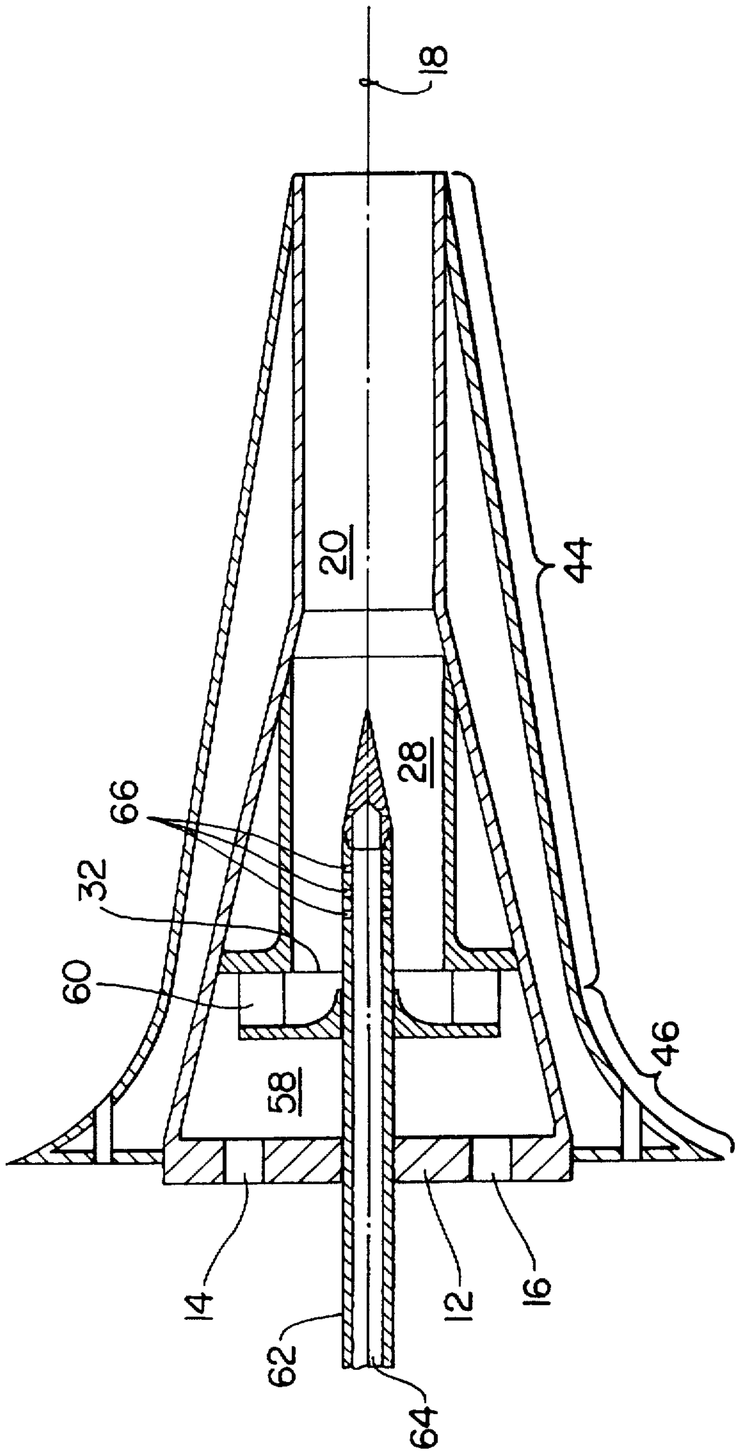
FIG. 3 is a longitudinal cross-sectional view of the centerbody of the present invention taken along line 3—3 of FIG. 2.

Referring to FIG. 3, an internal chamber 58 is located within the centerbody 10 between the base 12 and the second end 32 of the second cylindrical passage 28, which terminates at the chamber 58. The air supply ports 14, 16 in the base 12 communicate with the chamber 58, which in turn communicates with the internal passageway 20 through the second end 32 of the second cylindrical passage 28. A swirler 60, preferably of the radial inflow type known in the art, is coaxial with the longitudinal axis 18 and is located within the chamber 58 immediately adjacent the second end 32 of the second cylindrical passage 28 such that the internal passageway 20 communicates with the chamber 58 through the swirler 60.

A fuel lance 62, which likewise is coaxial with the longitudinal axis 18, extends through the base 12, the chamber 58, and the swirler 60, and into the second cylindrical passage 28 of the internal passageway 20. The larger diameter of the second cylindrical passage 28 accommodates the cross-sectional area of the fuel-lance 62, so that the flow area within the second cylindrical passage 28 is essentially equal to the flow area of the first cylindrical passage 22. The fuel lance 62 has an inner passage 64 therein, and fuel jets 66 located in the fuel lance 62 provide a pathway for the inner passage 62 to communicate with the internal passageway 20.

Testing on the centerbody 10 of the present invention has demonstrated that the centerbody 10 has a significantly increased operational life as compared to the prior art when used in gas turbine engines by reducing the tendency of flames to attach to the centerbody 10. Consequently, the present invention provides a solution to the problem that has prevented widespread use of tangential entry nozzles in gas turbine engines.

Although this invention has been shown and described with respect to a detailed embodiment thereof, it will be understood by those skilled in the art that various changes in form and detail thereof may be made without departing from the spirit and scope of the claimed invention.

We claim:

1. A centerbody for a tangential entry fuel nozzle, comprising:

a longitudinal axis, a centerbody base, said centerbody base having at least one air supply port extending therethrough, a radially outer surface including a frustum portion defining the outer surface of a frustum that is coaxial with the longitudinal axis and flares toward the frustum base thereof, and a curved portion which is integral with the frustum portion and preferably defines a portion of the surface generated by rotating a circle which is tangent to the frustum portion and has a center which lies radially outward thereof about the longitudinal axis, an internal passageway coaxial with the longitudinal axis and including a first cylindrical passage, a second cylindrical passage, and a tapered passage, each passage having a first end and a second end, said second cylindrical passage having a diameter greater than said first cylindrical passage, said second cylindrical passage communicating with said first cylindrical passage through said tapered passage, said first end of said tapered passage integral with said second end of said first cylindrical passage, said second end of said tapered passage integral with said first end of said second cylindrical passage, said first end of said tapered passage having a diameter equal to the diameter of the first cylindrical passage, and, said second end of said tapered passage having a diameter equal to the diameter of the second cylindrical passage, each of said passages coaxial with the longitudinal axis, said first cylindrical passage includes a discharge orifice that is circular, coaxial with said axis and located at the first end of said first cylindrical passage, an internal chamber located between said centerbody base and said second end of said second cylindrical passage, said air supply ports communicating with said second cylindrical passage through said chamber, a swirler coaxial with the axis and is located within the chamber immediately adjacent the second end of the second cylindrical passage, and a fuel lance coaxial with said axis and extending through said centerbody base, said internal chamber, and said swirler, and terminating within said second cylindrical passage.

* * * * *